Oct. 14, 1969     F. T. IRGENS     3,472,563
VEHICLE TRACK
Original Filed May 31, 1966
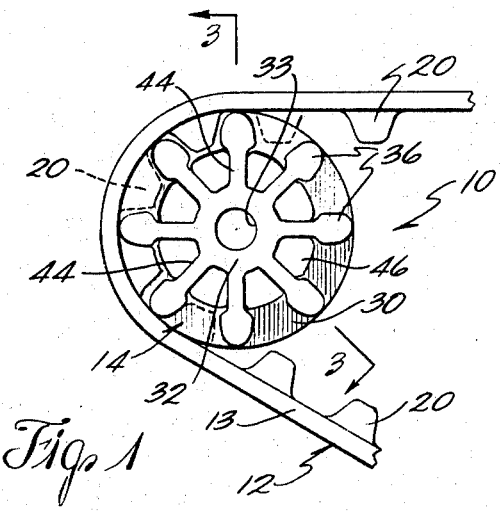
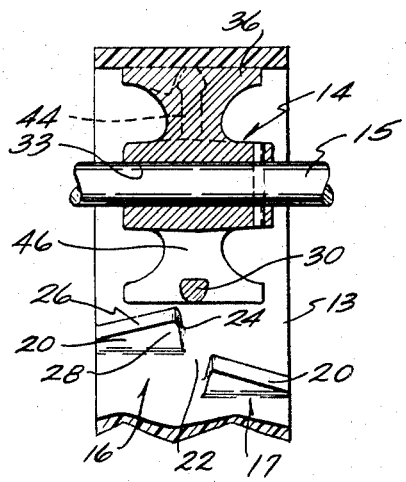
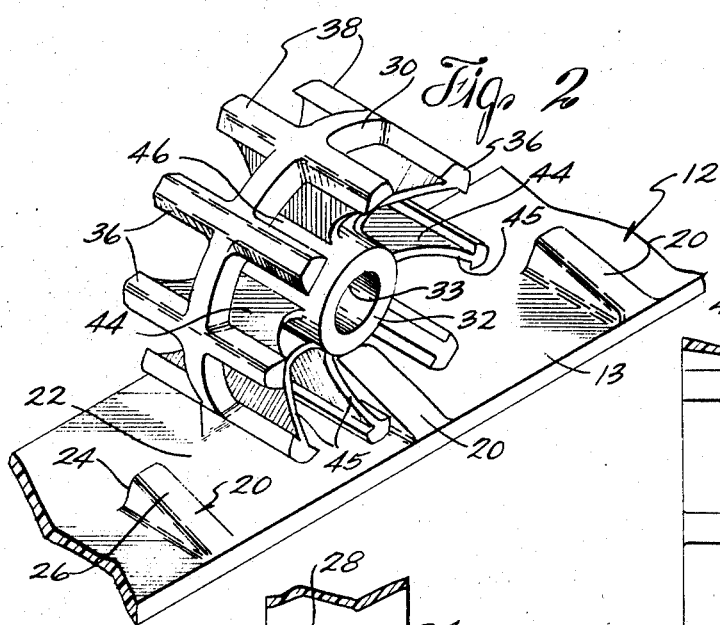
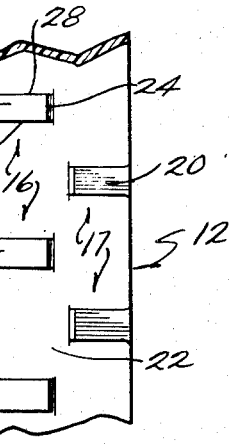
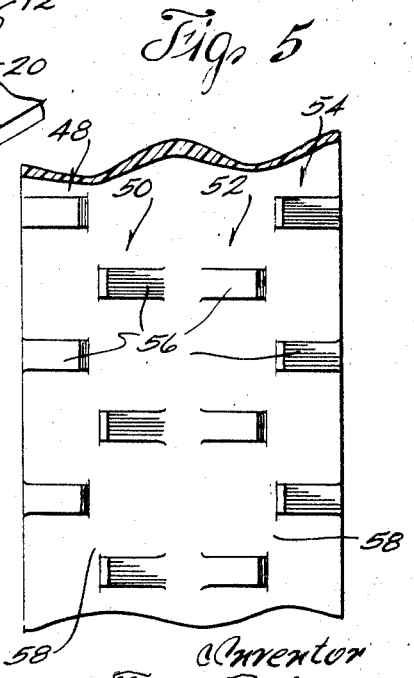
Inventor
Finn T. Irgens
By Wheeler, Wheeler & Wheeler
Attorneys.

United States Patent Office 3,472,563
Patented Oct. 14, 1969

3,472,563
VEHICLE TRACK
Finn T. Irgens, Milwaukee, Wis., assignor to Outboard
Marine Corporation, Waukegan, Ill., a corporation of
Delaware
Continuation of application Ser. No. 554,094, May 31,
1966. This application Nov. 22, 1967, Ser. No. 685,214
Int. Cl. B62d 55/24; F16h 7/02, 55/36
U.S. Cl. 305—13                                      13 Claims

ABSTRACT OF THE DISCLOSURE

Disclosed herein is the combination of a drive sprocket having a radially extending disc and a series of circumferentially spaced axially extending lugs extending from both sides of said disc adjacent to the periphery thereof, together with an endless track having a belt portion with a continuously flat inner surface or inner side and a pair of spaced and parallel rows of teeth extending from the inner side of the belt portion. The belt portion also includes longitudinal strips between rows of teeth and the teeth are evenly spaced with respect to one another in each row, with the teeth in one row being staggered with respect to the teeth in the other of the rows.

---

This is a continuation of application Ser. No. 554,094, filed May 31, 1966.

The invention relates to endless track constructions and to endless track driving arrangements. More particularly, the invention relates to driving arrangements for track vehicles.

One principal object of the invention is to provide an improved track construction which affords self-removal of ice, snow, mud or the like, thereby avoiding clogging with snow, mud, ice or the like. Another principal object of the invention is to provide an endless track driving arrangement for a vehicle, which driving arrangement will not become clogged with snow, mud, or other debris which may cling or could become lodged in the track.

In accordance with the invention, there is provided a track including a pair of laterally spaced rows of evenly spaced driving teeth in which the teeth in one row are located in staggered relation to the teeth in the other row. Thus, in planes transverse of the direction of intended track movement, the driving teeth of one row are located between the driving teeth of the other row. The staggered and spaced location of the driving teeth as well as the configuration of the driving teeth provides opportunity for self-removal of mud, snow or other debris which may lodge on the teeth.

Also in accordance with the invention, there is provided a drive sprocket which is disposed to engage the driving teeth and which is constructed to afford self-removal of mud, snow, ice or the like. The drive sprocket comprises an apertured disc carried on a hub affording mounting of the sprocket to a suitable drive shaft, and a plurality of circumferentially spaced driving lugs extending from opposite sides of the disc and arranged around the periphery of the disc. The sprocket and track are arranged so that the sprocket disc portion is received between the rows of teeth on the track and so that the driving lugs engage the teeth of the respective rows on the track.

Another principal object of the invention is to provide a driving mechanism for a track vehicle, which driving mechanism is efficient to operate and economical to manufacture.

Other objects, advantages and features of the invention will become apparent from the following description and accompanying drawings in which:

FIGURE 1 is a fragmentary side elevational view of an endless track driving arrangement incorporating various of the features of the invention;

FIGURE 2 is a perspective view of the driving arrangement shown in FIGURE 1;

FIGURE 3 is a cross sectional view generally taken along line 3—3 of FIGURE 1;

FIGURE 4 is a plan view of the inner side of the track shown in FIGURE 1; and

FIGURE 5 is a plan view of an alternative construction of the track.

Referring now to the drawings and more particularly to FIGURE 1, the driving arrangement of the invention is broadly identified by the numeral 10 and generally includes an endless track 12 which can be the driving track of a vehicle or the track of a conveyor belt or any other mechanism. Operatively mounted on the vehicle or any other apparatus embodying the track is a driving sprocket 14 operatively connected to a source of power, such as an engine or transmission or such. As shown in FIGURE 3, the sprocket 14 is operatively connected to a drive shaft 15.

Means are provided to afford driving of the track 12 by the sprocket 14 so as to avoid accumulations of snow or mud or other debris. Thus, in the preferred embodiment, the track 12 includes a belt portion 13 having a flat continuous inner side or surface and a pair of parallel rows 16 and 17 of laterally spaced driving teeth which extend from the flat inner side or surface of the belt portion.

The rows 16 and 17 are laterally spaced to provide an intermediate part or strip 22 of the belt portion 13 which cooperates with the teeth to provide a guideway or path between the rows 16 and 17 of teeth. The rows 16 and 17 each include a plurality of driving teeth 20 which are evenly spaced with respect to one another and which are arranged so that the teeth of one row are staggered, in the direction of track movement, relative to the teeth of the other row, whereby the teeth of row 17 are generally aligned with the spaces between teeth of row 16 and vice versa.

The teeth 20 are all formed to include slanted or inclined inner and outer surfaces 24 and 26, together with side surfaces 28. As shown in the drawings, the surface 24 extends outwardly or away from the belt portion 13 and away from the intermediate strip 22. The surface 26 extends from the surface 24 toward the belt portion and away from the strip 22. If desired, the track can be manufactured as by molding from an elastomeric plastic material.

Disposed for engagement with the teeth 20 of the track 12 is the drive sprocket 14 which can be considered to include a center rim portion or disc 30 which is preferably apertured as will be further described and which extends perpendicularly or radially from a hub 32 which has a central bore 33 receiving the drive shaft 15 shown in FIGURE 3. Extending oppositely from the outer periphery of the disc are a series of circumferentially spaced and transversely or axially extending driving lugs 36 which are disposed to alternately engage the teeth 20 of the rows 16 and 17 upon rotation of the drive sprocket. The circumferential width or thickness of the driving lugs 36 is somewhat less than the spacing between the teeth 20 on the track 12 and the pitch of the sprocket 14 is slightly less than the pitch of the track 12 to afford alignment of the lugs 36 with the teeth 20 during initial engagement of the sprocket 14 with the track 12 and prior to driving engagement between the lugs 36 and the teeth 20.

The outer surface 38 of the driving lugs 36, which surface engages or contacts the underside or inner side of the track 12 and the base portions of the teeth 20 is curved to afford smooth engagement of the driving lugs 36 with the teeth 20.

In order to provide support to the driving lugs 36, the sprocket 14 includes webs 44 extending from the underside of the lugs 36 and from the rim 30 to the hub 32. Preferably, the webs include concave edges 45 designed to facilitate escape from the sprocket 14 of snow, mud, etc., the axial extent of the webs 44 decreasing from adjacent to the lugs 36 to adjacent to the hub 32.

In order to further facilitate escape of snow, ice, mud, or the like, the disc 30 preferably includes a plurality of apertures 46 located in the area between the webs 44 and between the hub 32 and the outer periphery of the disc 30. In operation, the periphery of the disc 30 is received in the guideway or path 22 between the rows 16 and 17 of teeth 20 and the driving lugs 36 engage one tooth at a time from the alternate rows 16 and 17. The staggered configuration of the teeth 20 as well as the design and shape of the teeth affords easy escape of any debris that may be trapped between the teeth and between the sprocket and track upon rotation of the drive sprocket.

In the alternate construction shown in FIGURE 5, the track includes four laterally spaced parallel rows 48, 50, 52, and 54 of spaced teeth 56. The outer two rows 48 and 54 of teeth are laterally aligned with each other, and the inner two rows 50 and 52 of teeth are laterally aligned with each other and staggered from the outer rows 48 and 54 of teeth. Adjacent inner and outer rows are spaced from one another so as to provide a pair of guideways or paths 58 for a pair of discs, such as the disc 30, and are shaped as explained with respect to the track 12. Alternatively, the inner two rows 50 and 52 could be spaced to provide a guideway or path for receipt of the central disc of a drive sprocket, such as the sprocket 14. In operation, the driving lugs of a sprocket alternately engage the laterally aligned teeth of the outer two rows and the laterally aligned teeth of the inner two rows. The arrangement provides sufficient gaps between the teeth to allow escape of snow, mud, or other debris from the teeth during driving operation by the sprocket, thereby affording self-cleaning operation.

Various of the features of the invention are set forth in the following claims.

What is claimed is:

1. An endless track including a portion of substantial length having on the inner side thereof a first pair of parallel rows of teeth located in spaced relation to each other, all of said teeth in said first pair of rows being evenly spaced with respect to one another in each row and all of said teeth in one row being staggered with respect to all of said teeth in the other of said rows, and a second pair of spaced and parallel rows of teeth located in spaced and parallel relation to said first pair of rows of teeth, all of said teeth in said second pair of rows being evenly spaced from one another at the same distance as the spacing of said teeth in said first pair of rows, and all of said teeth in one row of said second pair of rows being aligned with said teeth in one row of said first pair of rows and with all of said teeth in the other of said second pair of rows being aligned with said teeth in the other row of said first pair of rows.

2. An endless track having a belt portion and a pair of parallel rows of teeth projecting from the inner side of said belt portion so as to define between said rows of teeth a longitudinally extending intermediate part, said teeth being formed with a first surface extending generally longitudinally of said track and in inclined relation away from said belt portion and away from said intermediate part, and with a second surface extending longitudinally of said track from the end of said first surface remote from said belt portion and in inclined relation toward said belt portion and away from said intermediate part.

3. The combination of a circumferential drive sprocket including a central disc, a plurality of circumferentially spaced and axially extending lugs extending from said disc, a hub, respective radially extending webs connecting said lugs, said disc, and said hub, said webs having an axial extent diminishing from adjacent to said lugs to adjacent said hub, and a space between said disc and said hub defining a plurality of openings located between said hub and the periphery of said disc and between said webs, and an endless track trained around said sprocket and having a plurality of longitudinally spaced teeth received between said lugs.

4. The combination of a drive sprocket having a hub, a disc extending radially from said hub, a series of circumferentially spaced and axially extending lugs extending from both sides of said disc adjacent to the periphery thereof, and respective radially extending webs connecting said lugs, said disc, and said hub, the axial extent of said webs diminishing from adjacent to said lugs to adjacent said hub, and said disc including a plurality of apertures located between said webs and between said hub and the periphery of said disc, and an endless track having a belt portion and a pair of spaced and parallel rows of teeth extending from the inner side of said belt portion, said belt portion including a longitudinal strip between said rows, said teeth being evenly spaced with respect to one another in each row and said teeth in one row being staggered with respect to said teeth in the other of said rows, said teeth each being formed with a first surface extending generally longitudinally of said track and in inclined relation away from said belt portion and said strip and with a second surface extending longitudinally of said track from the outer end of said first surface in inclined relation toward said belt portion and away from said strip, said track being trained around said sprocket with at least some of said teeth being received between said lugs and with said disc being received between said parallel rows of teeth.

5. An endless track including a belt portion of substantial length having two pairs of parallel rows of teeth extending from the inner side of said belt portion, said belt portion including a longitudinal strip between said pairs of rows, all of said teeth being evenly spaced with respect to one another in each row and all of said teeth in one row of each pair being staggered with respect to said teeth in the other of said rows of each pair, and said teeth in each pair of rows being aligned with said teeth in the other of said pairs of rows.

6. An endless track in accordance with claim 5 in combination with a drive sprocket having a radially extending disc and a series of circumferentially spaced and axially extending lugs extending from both sides of said disc adjacent to the outer periphery thereof, said track being trained around said sprocket with said disc being received between said parallel pairs of rows.

7. The combination of a drive sprocket having a radially extending disc and a series of circumferentially spaced and axially extending lugs extending from both sides of said disc adjacent to the periphery thereof, and an endless track having a belt portion and a pair of spaced and parallel rows of teeth extending from the inner side of said belt portion, said belt portion including a longitudinal strip between said rows, said teeth being evenly spaced with respect to one another in each row and said teeth in one row being staggered with respect to said teeth in the other of said rows, said teeth each being formed with a first surface extending generally longitudinally of said track and in inclined relation away from said belt portion and said strip and with a second surface extending longitudinally of said track from the outer end of said first surface in inclined relation toward said belt portion and away from said strip, said track being trained around said sprocket with at least some of said teeth being received between said lugs and with said disc being received between said parallel rows of teeth.

8. An endless track having a belt portion and a pair of parallel rows of teeth projecting from the inner side of said belt portion, said teeth in each of said rows being formed with a first surface extending generally longitudinally of said track and in inclined relation away from from said belt portion and away from said teeth in the other of said rows, and with a second surface extending longitudinally of said track from the end of said first surface remote from said belt portion and in inclined relation toward said belt portion and away from said teeth in the other of said rows.

9. The combination of a drive sprocket having a circumferentially spaced series of lugs extending substantially axially and defining a circumferentially spaced series of axially extending and outwardly open voids between said lugs and an endless belt trained around said sprocket and having on the otherwise generally flat and unbroken inside surface thereof a series of teeth extending axially with respect to said sprocket for a distance less than the width of said belt being axially staggered lengthwise of said belt and being longitudinally spaced so as to locate said teeth in every other of said voids as said belt travels around said sprocket.

10. The combination of a drive sprocket having a circumferentially spaced series of lugs extending substantially axially and an endless belt trained around said sprocket and having on the otherwise flat and unbroken inside surface thereof a series of teeth extending axially with respect to said sprocket for a distance less than the width of said belt being axially staggered lengthwise of said belt and having corresponding portions longitudinally spaced from one another at distances at least as great as the circumferential distance between corresponding portions of three adjacent lugs.

11. The combination of a drive sprocket having two circumferentially spaced series of lugs extending substantially axially in axially adjacent relation to each other, said lugs defining two axially adjacent circumferential series of axially extending and outwardly open voids between said lugs, and an endless belt trained around said sprocket and having on the otherwise generally flat and unbroken inside surface thereof two laterally located rows of teeth, one of said rows of teeth engaging one of said series of lugs and the other of said rows of teeth engaging the other of said series of lugs, said teeth in one of said rows being located between said teeth in the other of said rows so that said inside surface is transversely open between longitudinally spaced teeth, said teeth being spaced so that in each row said teeth enter into every other void of the associated series of voids as said belt travels around said sprocket.

12. The combination of a drive sprocket having two circumferentially spaced series of lugs extending substantially axially in axially adjacent relation to each other, and an endless belt trained around said sprocket and having on the otherwise generally flat and unbroken inside surface thereof two laterally located rows of teeth, one of said rows of teeth engaging one of said series of lugs and the other of said rows of teeth engaging the other of said series of lugs, said teeth in one of said rows being located between said teeth in said other of said rows so that said inside surface is transversely open between longitudinally spaced teeth, and said teeth having corresponding portions in each row longitudinally spaced at distances at least as great as the circumferential distance between corresponding portions of three adjacent lugs in the respectively engaged one of said series of lugs.

13. The combination of a drive sprocket having a circumferential rim and two circumferentially spaced series of lugs extending in an aligned relation to each other from the opposite sides of said rim, said lugs defining two axially aligned circumferential series of voids between said lugs, and an endless belt trained around said sprocket and having on the inside surface thereof two laterally spaced rows of teeth, said rim being located between said rows of teeth with one of said rows of teeth engaging one of said series of lugs and the other of said rows of teeth engaging the other of said series of lugs, said teeth in both of said rows being located at the same spacing and said teeth in one of said rows being centered intermediate said teeth in said other of said rows, said teeth being spaced so that in each row said teeth enter into every other void of the associated series of voids as said belt travels around said sprocket.

References Cited

UNITED STATES PATENTS

| 1,774,797 | 9/1930 | Knox | 305—57 X |
|---|---|---|---|
| 1,963,249 | 6/1934 | Rorabeck. | |
| 2,167,039 | 7/1939 | Ekbom. | |
| 2,592,541 | 4/1952 | Curtis. | |
| 2,739,017 | 3/1956 | Arps. | |
| 2,770,977 | 11/1956 | Beckadolph. | |
| 2,987,347 | 6/1961 | Cook. | |
| 1,683,955 | 9/1928 | Carrey | 74—219 X |
| 3,155,436 | 11/1964 | Bonmartini | 305—13 |
| 675,703 | 6/1901 | Allen | 198—198 |
| 3,341,260 | 9/1967 | Skancs | 305—57 X |
| 3,082,044 | 3/1963 | Klemm. | |

FOREIGN PATENTS

| 49,771 | 4/1939 | France. |
|---|---|---|
| 1,284,362 | 1/1962 | France. |
| 914,214 | 12/1962 | Great Britain. |
| 466,116 | 10/1928 | Germany. |

RICHARD J. JOHNSON, Primary Examiner

U.S. Cl. X.R.

74—229, 231, 230.6; 305—35, 57